US006984671B2

(12) United States Patent
Johnson et al.

(10) Patent No.: US 6,984,671 B2
(45) Date of Patent: *Jan. 10, 2006

(54) SINTERABLE STRUCTURES AND METHOD

(75) Inventors: James R. Johnson, Boca Raton, FL (US); Michael Edward Frencl, Monticello, MN (US)

(73) Assignee: Phillips Plastics Corporation, Phillips, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/457,903

(22) Filed: Jun. 10, 2003

(65) Prior Publication Data

US 2003/0212154 A1   Nov. 13, 2003

Related U.S. Application Data

(63) Continuation of application No. 09/286,919, filed on Apr. 6, 1999, now Pat. No. 6,605,648.

(51) Int. Cl.
  *C08J 9/28* (2006.01)
(52) U.S. Cl. .................... 521/64; 521/77; 521/82; 264/126; 264/44; 264/621; 264/628
(58) Field of Classification Search ............. 264/44, 264/126, 621, 628; 521/52, 64, 77, 82
See application file for complete search history.

(56) References Cited

U.S. PATENT DOCUMENTS

| | | | |
|---|---|---|---|
| 2,093,454 | A | 9/1937 | Kistler |
| 3,508,941 | A | 4/1970 | Johnson |
| 3,864,124 | A | 2/1975 | Breton et al. |
| 3,897,221 | A | 7/1975 | Sayler et al. |
| 4,090,022 | A | 5/1978 | Tsao et al. |
| 4,246,221 | A | 1/1981 | McCorsley, III |
| 4,341,663 | A | 7/1982 | Derleth et al. |
| 4,416,698 | A | 11/1983 | McCorsley, III |
| 4,610,832 | A | 9/1986 | Brockmeyer |
| 5,055,429 | A | 10/1991 | James et al. |
| 5,252,284 | A | 10/1993 | Jurkovic et al. |
| 5,427,721 | A | 6/1995 | Brezny et al. |
| 5,540,874 | A | 7/1996 | Yamada et al. |
| 5,827,797 | A | 10/1998 | Cass et al. |
| 5,997,603 | A | 12/1999 | Noro et al. |
| 6,605,648 | B1 * | 8/2003 | Johnson et al. ........... 521/64 |

FOREIGN PATENT DOCUMENTS

| | | |
|---|---|---|
| DE | 40 33 626 A1 | 4/1992 |
| DE | 4426966 A1 | 7/1994 |
| DE | 44269966 C2 | 7/1994 |
| DE | 198 38 263 | 3/1999 |
| JP | 60 215516 | 10/1985 |

OTHER PUBLICATIONS

Sigma-Aldrich Co., "4-MethylmorpholineN-oxide solution", search at www.aldrich.com, printed Oct. 14, 2004.*

Harmon et al., "Thermodynamic and IR study of the hydrates of N-methylmorpholine oxide and quinuedtidine oxide. Effect of hydrate stoichiometry on strength of H-O-H . . . O-N hydrogen bonds; implications for the dissolution of cellulose in amine oxide solvents." *Journal of Molecular Structure*, Eleseview Science Publishers 1992.

Maruno et al., "Micro-observation and characterization of bonding between bone and HA-glass-titanium functionally gradient composite," *Biomaterials* Mar. 1991, vol. 12.

"Thermostable hollow membranes for separation process", D. Vorbach, Th. Schulze, E. Taeger, Technical Textiles, vol. 42, Apr. 1999, p. E20-E23.

"Ceramic hollow membranes, filaments and structural materials based on the Alceru process", D. Vorbach, Th. Schulze, E. Taeger, Technical Textiles, vol. 41, Nov. 1998, p. E54-E57.

"Lycocell products with built-in functional properties", F. Meister, D. Vorbach, Ch. Michels, R. Maron, K. Berghof, E. Taeger, Chemical Fibers International, vol. 48, Feb. 1998, p. 32-35.

"Herstellung keramischer Hohlmembranden und -filamente nach dem Lyocell-Verfahren", D. Vorbach, T. Schulze, E. Taeger, Keramische Zeitschrift No. 50, Mar. 1998, p. 176, 178 and 179.

Kim, Seong Su, et al., "Ultrastable Mesostructured Silica Vesicles," *Science* Nov. 13, 1998 pp. 1302-1305.

Takao, Yasumasa, et al. "Preparation of a multilayer and a compositional gradient layer composite by the aerosol filtration method," J. Mater. Res., vol. 9, No. 8, Aug. 1994 pp. 2128-2132.

Adoba, A.E., et al. Study of the Mechanical Properties and Bioactivity of Functionally Graded Titanium Matrix Composites Reinforced with Bioactive Particles, Proceeding: Eleventh International Conference on Composite Materials, Australian Composite Structures Society Woodhead Publishing Limited, Queensland, Australia, Jul. 14-18, 1997. pp. I-496-I-508.

(Continued)

*Primary Examiner*—Melanie Bissett
(74) *Attorney, Agent, or Firm*—Fredrikson & Byron, P.A.

(57) ABSTRACT

A method of producing an open, porous structure having an outer surface defining a shape having a bulk volume and having interconnecting openings extending throughout said volume and opening through said surface, and products resulting from the method. The method comprises preparing a viscous mixture comprising a sinterable powder dispersed in a sol of a polymer in a primary solvent, replacing the primary solvent with a secondary liquid in which the polymer is insoluble to produce a gel comprising an open polymeric network having the sinterable powder arranged therein, removing the secondary liquid from the gel; removing the polymer network, and sintering the sinterable powder to form the open, porous structure. Also disclosed are shaped, porous products resulting from methods of the invention.

14 Claims, No Drawings

OTHER PUBLICATIONS

Stack, M. M. and Pena, D., "Surface Engineering of Composite and Graded Coatings for Resistance to Solid Particle Erosion at Elevated Temperatures," *Advances in Surface Engineering, Volum III: Engineering Application* pp. 260-276.

Pratapa, S., et al., "Infiltration-processed, functionally graded aluminum titanate/zirconia-alumina composite; Part I Microstructural characterization and physical properties," *Journal of Materials Science*, Perth, Australia, pp. 3037-3045.

Pratapa, S., et al., "Infiltration-processed, functionally graded aluminum titanate/zirconia-alumina composite; Part II Mechanical properties," *Journal of Materials Science*, Perth, Australia, pp. 3047-3053.

* cited by examiner

SINTERABLE STRUCTURES AND METHOD

CROSS-REFERENCE TO RELATED APPLICATIONS

This is a continuation application of and claims priority to U.S. application Ser. No. 09/286,919 filed Apr. 6, 1999, U.S. Pat. No. 6,605,648, which is incorporated in its entirety herein by reference.

FIELD OF THE INVENTION

The present invention relates to sinterable and sintered structures which are microporous and self-supporting.

BACKGROUND OF THE INVENTION

Sintered, porous materials made of, for example, ceramics or metals, have many uses in a variety of fields, including the fields of industry and medicine. Certain porous sintered structures can serve as filters, for example, whereas others may serve as bone substitute materials. Sinterable particles of various types may be molded, with or without the presence of organic binders, into a desired shape and then fired to remove the binder and to cause the particles to flow into each other at their points of contact. Preformed polymeric structures such as sponges and the like may be infused with a ceramic slip, dried, and fired to remove the organic support and to sinter together the ceramic particles, all for the purpose of manufacturing materials having reasonably large size pores and which are suitable for use as bone substitute materials. Reticulated structures of this kind have the advantage over other porous structures in that there is a three dimensional open continuum without openings being blocked. Thus, full advantage is taken for any merit that porosity confers such as having a fully available internal surface area.

In conventional sintered materials such as ceramic bodies, structures free of pores are normally desired. In the early stages of sintering or consolidation, pores in the structure are largely open from one pore to the next, but the structure is weak. As sintering proceeds, the pores become increasingly smaller and eventually are closed as they are filled by various sintering mechanisms such as diffusion. When a sintered body is about 90% dense, nearly all the pores are closed and thus are isolated from one another.

In general terms, the strength of a sintered body increases as porosity decreases. Conventional methods of making porous bodies involve the use of foaming agents, or the use of particulate materials that can be burned out, but interconnections between the resulting pores are usually far from complete. Connections leading to a more open porosity increase with greater pore formation; hence, resulting in less solid materials with thinner walls and leading to weak structures. These processes have been applied to making closed pore media useful for thermal insulation. Where very fine pores are needed, strength is sacrificed as is the degree of porosity available.

SUMMARY OF THE INVENTION

We have discovered, surprisingly, that a strong sintered article can be made that has a structure remarkably similar to conventional reticulated structures (that is, made up of a network of interconnected struts that form a strong, open, interconnected continuum of pores) but in which the struts and openings are orders of magnitude smaller than those of the conventional reticulated structures. The article thus provides a substantially greater open and available surface area than do conventional porous ceramics, and exhibits unexpectedly very fine pores for a given density or strength of the basic material. The article also provides a large network of open channels for contact of these internal surfaces with fluid or gaseous media in processes such as adsorption or catalysis.

Certain polymers such as cellulose can be dissolved in such solvents as N-methylmorpholine-N-oxide to form very viscous, shapeable sols. As an example, a viscous sol of cellulose and N-methylmorpholine-N-oxide (hereafter sometimes referred to as "NMMO"), when contacted with water or alcohols with which the NMMO is miscible but in which the cellulose is not soluble, will coagulate as the NMMO is extracted from the sol, leaving behind an open cellulose structure. The viscous sol can be formed into various shapes, such as fibers, before coagulation occurs; coagulation occurs substantially instantly upon contact with water to regenerate the cellulose in the desired shape. Reference is made to U.S. Pat. No. 4,246,221 (McCorsley), U.S. Pat. No. 4,416,698 (McCorsley), U.S. Pat. No. 5,252,284 (Jurkovic et al.) and U.S Pat. No. 5,540,874 (Yamada et al.). See also U.S. Pat. No. 3,508,941 (Johnson). We further are aware that it has been proposed to add a variety of materials such as flavors, colors, etc. to the thus regenerated cellulose in the shape of beads, or materials such as enzymes to cellulose beads formed by other solvent systems as shown in Tsao et al, U.S. Pat. No. 4,090,022.

The present invention provides a strong, self-supporting, microporous (e.g., having pore sizes in the 0.1–10 micron ($\mu$) range) reticulum-like open sintered structure having a variety of uses. The invention also pertains to methods for manufacturing the structure in which the shape of the structure can be readily formed prior to the sintering step.

Briefly, we have found that a sinterable power such as a ceramic or metal can be mixed into a sol of a polymer such as cellulose in a primary solvent such as an amine oxide solvent, (NMMO, for example), following which the mixture can be coagulated to form a gel by contact with a secondary liquid in which the polymer is not soluble and which extracts and replaces the primary solvent, leaving behind a fine, open polymeric network having the sinterable powder arranged in it. The material can be appropriately shaped into fibers, sheets, tubes, rods, etc. either in the form of the viscous sol (by, e.g., extrusion of the viscous, sinterable powder-containing sol into the second, non-solvent for the polymer), or the gel comprising the open, polymeric network having the sinterable powder arranged in it and containing the secondary liquid, such as water, can be suitably formed as by molding to produce the desired shape.

By raising the temperature of the shaped object, the secondary liquid is driven off, enabling the shaped object to shrink if this is desired. Continued heating causes the polymer to be removed, as by pyrolysis, leaving behind it a network of sinterable particles in contact with one another, and, finally, raising the material to sintering temperatures causes the particles to sinter into a porous, self-supporting reticulum.

The resulting sintered product has an outer surface defining a shape having a bulk volume and having interconnecting openings extending throughout the volume and opening through the surface.

Thus, in one embodiment, the invention pertains to a method of producing a porous, sintered structure having an outer surface defining a shape having a bulk volume and having interconnecting openings extending throughout the volume and opening through the surface, comprising of a series of steps, including:

a. preparing a viscous mixture comprising a sinterable powder dispersed in a sol of a polymer in a primary solvent,
b. replacing the primary solvent with a secondary liquid in which the polymer is insoluble to produce a gel comprising an open polymeric network having the sinterable powder arranged therein,
c. removing the secondary liquid from the gel; and
d. sintering the sinterable powder to form the open, porous structure.

In a preferred form of the invention, the method includes the step of forming the material into a predetermined shape, either when the material is in the form of the viscous sol containing the sinterable powder, or, later, when the primary solvent has been replaced by the secondary liquid. When the viscous sol is thus shaped, cooling of the shaped sol before performing step (b) may serve to increase the dimensional stability of the product and reduce distortion when the primary solvent is replaced with the secondary liquid.

In another embodiment, the invention pertains to a shaped, porous product having an outer surface defining a shape having a bulk volume and having interconnecting openings extending throughout that volume and opening through the surface, the article being formed by a method comprising forming into a predetermined shape a shapeable, viscous mixture comprising a sinterable powder dispersed in a sol of a polymer in a primary solvent, and replacing the primary solvent with a secondary liquid in which the polymer is insoluble to produce a gel comprising an open polymeric network having the sinterable powder arranged therein. The secondary liquid is removed from the gel, and the gel is heated to remove the polymeric network and to sinter the sinterable powder to form the shaped open porous structure. Alternatively, the product may be formed by a similar method in which shape forming, as by molding, is performed on the gel after the primary solvent has been replaced with the secondary liquid.

As described above, certain of the porous products of the invention are not only strong and self supporting but in addition present a large available surface. Hence, in another embodiment, the invention relates to a sintered porous article having an outer surface defining a shape having a bulk volume and having a plurality of open, interconnecting pores extending throughout said volume and opening through said surface, the article thus providing a large available surface area on the order of about 1.0 square meters per gram or greater.

In yet another embodiment, the invention relates to a formable material that is capable of being sintered to produce a porous, self-supporting structure. The formable product comprises, in combination, a viscous sol of a polymer dissolved in a primary solvent and which, when contacted with a secondary liquid in which the primary solvent but not the polymer is soluble, forms an open polymeric network. The material includes a sinterable powder dispersed in the viscous sol.

In yet another embodiment, the invention relates to a formable product capable of being sintered to produce an open, porous, self-supporting structure having an outer surface defining a shape having a bulk volume and having interconnecting openings extending throughout said volume and opening through said surface, comprising, in combination, a viscous sol of a polymer in a primary solvent, the weight ratio of polymer to primary solvent not exceeding about 1/10, and a sinterable powder arranged in the sol.

In a further embodiment, the invention relates to a formable product capable of being sintered to produce an open, porous, self-supporting structure having an outer surface defining a shape having a bulk volume and having interconnecting openings extending throughout said volume and opening through said surface, comprising, in combination, a gel formed of a polymer in a secondary liquid in which the polymer is insoluble, the weight ratio of polymer to secondary liquid in the gel not exceeding about 1/10, and a sinterable powder arranged in the gel.

"Sol", as used herein in connection with the viscous material resulting from the dissolution of a polymer such as cellulose in a primary solvent such as NMMO, refers to a fluid in which polymeric colloids, e.g., microfibrils of cellulose, are dispersed in the primary solvent. The sol may be cooled or coagulated into a gel—a coherent mass that is solid or jelly-like. When the primary solvent is replaced with the non-solvent secondary liquid to cause coagulation of the sol in the instant invention, a gel results. Particles of the sinterable powder are held in the resulting network of microfibrils. The polymer network is removed, the product is heated, and the particles sinter together to form the unique microporous, microreticulated structure of the invention.

DETAILED DESCRIPTION OF THE PREFERRED EMBODIMENT

An interesting part of the method of the present invention involves forming an expanded, open, polymer structure within which is dispersed a sinterable powder with the powder being supported by the polymer structure in such a fashion that as the polymer structure is heated, with such concurrent shrinkage as may occur, the sinterable powder particles appear to substantially retain their positions relative to each other, the particles eventually becoming sintered to each other as sintering temperatures are reached. In the case of sinterable ceramic or metal particles which sinter at high temperatures, the polymeric network holding the dispersed particles will tend to shrink as the polymer itself is removed through pyrolysis, but it has been found that the sinterable particles, rather than being released from one another, are drawn together so that when sintering temperatures are reached, the particles themselves will sinter to other particles that they touch to provide the microreticular structure of the invention.

Without being bound by the following explanation, it is believed that the positioning of the particles in the gel, on a microscopic level, is guided at least partially by the positions of the polymeric microfibrils such that the resulting microreticular structure of the sintered product follows to some extent the positions of the fibrils. The resulting product is an open, porous, self-supporting structure having an outer surface defining a shape having a bulk volume and having interconnecting openings or pores extending throughout the volume in a three-dimensional configuration and opening through the outer surface of the product.

The Polymer

The polymer (or blend of polymers, as the case may be) useful in the present invention has several characteristics. First, it must form a sol in a primary solvent, as described above, and must be insoluble in a secondary liquid which is miscible with the primary solvent. Without being bound to the following explanation, it is believed that the polymer, as dissolved, largely retains its molecular chain structure, but that the polymer chains become spaced from one another in the primary solvent. The polymer and primary solvent form a sol that has a substantial viscosity, that is, in the range of about 100 to 5000 poises and above. The sol may be substantially solid—a gel—at lower temperatures such as room temperature; that is, it may be comminuted or otherwise cut and shaped, and the viscous sol may be reconstituted upon heating.

When, as is preferred, the polymer is a cellulose, various fractions having different degrees of polymerization may be utilized, either by themselves or in mixtures or blends of fractions, to obtain varying results. Reference is made to U.S. Pat. No. 5,540,874 (Yamada et al.), the teachings of which are incorporated herein by reference. The sol, and the resulting gel, contains only a very small concentration of polymer in comparison to the amount of liquid, and the weight ratio of polymer to liquid in both the sol and gel is not greater than about $1/10$, and desirably is in the range of about 1/100 to about 7/100. The polymer network of the sol and the resulting gel thus is very open.

Preferred polymers are those which can exist in a somewhat fibrous form capable of forming gels, and these include such polysaccharides as cellulose, chitin, and starch. Other potential polymers include the oxygen containing polymers such as poly(vinyl alcohol) and nitrogen bearing polymers such as polyamides, poly(vinyl pyrrolidones) and various polypeptides such as wool, silk, and gelatin. It is believed that the chains of polymers useful in the present invention interengage with one another through hydrogen bonding, as, for example, is the case with cellulose, which hydrogen bonding is interrupted in the presence of a suitable primary solvent. It will be understood, however, that the present invention can utilize any polymers, including polymer blends, which have the characteristics set out above, that is, that it is soluble in a primary solvent to form a viscous sol, insoluble in a secondary liquid that is miscible with the primary solvent to form a gel, and that upon extraction of the primary solvent from a viscous sol of the polymer, the polymer exists as an open, polymeric network.

Of the various polymers that have been considered, cellulose is very suitable, and fibrous cellulose, as is found in cotton, for example, and powdered cellulose (cellulose fibers with a smaller aspect ratio) have given acceptable results.

Solvents

The primary solvent and the secondary liquid, are chosen in connection with the polymer that is employed. As mentioned above, the polymer must be soluble in the primary solvent, must be insoluble in the secondary liquid, and the primary and secondary liquids must be miscible so that the secondary liquid can replace the primary solvent from a viscous sol of the polymer in the primary solvent. By "miscible", we mean that the secondary liquid and primary solvent are soluble in each other, preferably in most if not all concentrations.

For polysaccharide polymers such as cellulose, primary solvents may include the amine oxide solvents such as N-methylmorpholine-N-oxide, N-methylpiperidine-N-oxide, N-methylpyrrolidine-N-oxide and N-methylazacycloheptane-N-oxide. N,N-dimethylpiperazine may also be appropriate as a primary solvent ingredient. Of the above-listed solvents, N-methylmorpholine-N-oxide (NMMO) containing water in an amount less than about 2 moles of water to 1 mole of NMMO is preferred, and when for simplicity reference is made to NMMO as a primary solvent, it will be understood that this refers to an NMMO/water mixture having a mole ratio of water to NMMO of not greater than 2.

A discussion of NMMO and other solvents for cellulose is found in K. M. Harmon et al., Thermodyanimic and IR study of the hydrates of N-methylmorpholine oxide and quinuclidine oxide. Effect of hydrate stoichiometry on strength of H—O—H . . . O—N hydrogen bonds; implications for the dissolution of cellulose in amine oxide solvents, J. Mol. Struct. (Netherlands) 269, No. 1–2, pp. 109–121 (1992), the teachings of which are incorporated herein by reference.

The purpose of the secondary liquid is to extract the primary solvent from the viscous polymeric sol to coagulate the polymer, now in a liquid in which it is insoluble, as a gel of a highly porous, open polymeric network within which sinterable powder particles are arranged and retained. Although the powder is distributed relatively uniformly throughout the gel on a macroscopic basis, the powder particles on a microscopic basis are positioned and guided by the positions of the microfibrils of the gel. Shrinkage of the product upon removal of some or all of the secondary liquid can be largely controlled by controlling concentrations and form (e.g., microagglomerates) of the various ingredients and by controlling the peak temperature and/or rate at which heating is accomplished.

The polymer network of the gel appears to result in an arrangement of the sinterable particles along and between the microfibers of the network so as to moderate movement of the particles as the gel shrinks; that is, as the gel shrinks, the particles, rather than collapsing into a very close-packed arrangement, appear to maintain to some extent their respective positions, and it is believed that this phenomenon is at least partially responsible for the resulting open, porous structure of the product that results from subsequent sintering.

In connection with celluloses, the secondary liquid ideally is water, which is miscible with NMMO, but which is a non-solvent for cellulose. The secondary liquid may also include alcohols, particularly lower aliphatic alcohols such as methanol, n-propanol, i-propanol and butanol.

It will be understood that the primary solvent and the secondary liquid may actually be mixtures of different liquids. For example, as noted above, a primary solvent for cellulose may include both NMMO and water. Cellulose will dissolve in this primary solvent when the mole ratio of water to NMMO is 2 or less. As noted below, the cellulose may be mixed with a liquid containing the primary solvent and water, e.g., the liquid may contain about 50% to about 70% of NMMO, the remainder being water. Heating of the mixture causes the concentration of the water to decrease as the mixture is heated, the polymer eventually dissolving as the liquid becomes the primary solvent. The secondary liquid may be also a mixture of NMMO and water, but containing a sufficient concentration of water as to render the cellulose insoluble in it. In a continuous procedure for making articles of the invention, NMMO may be recycled, as by stripping it from the secondary liquid, as the concentration of NMMO in the latter rises above a workable level.

In connection with chitin, a suitable primary solvent is dimethylacetamide containing a small amount of lithium chloride. The secondary liquid useful in this regard may be methanol, in which the dimethylacetamide and lithium chloride are miscible, but in which chitin is insoluble.

The Sinterable Powder

As used herein, "sinterable" refers to the quality of the particulate concentration, the particles of which are in contact, to join to each other at their points of contact to form a coherent mass. Sintering may occur without melting in the case of metal or ceramic particles, or by melting, as in the case with thermoplastic particles. For example, hydroxyapatite powders may be employed having particle sizes in the micron to sub micron range, and mixtures of hydroxyapatite particle agglomerates of several microns in diameter with individual particles in the 0.1 micron size range have given acceptable results.

Among the ceramic powders that may be employed in the current invention are zirconia, alumina, silica, zinc oxide, zeolites, titania, and the various calcium phosphates such as fluorapatite, hydroxyapatite and other tricalcium phosphates. Metal powders include iron, titanium, nickel, cobalt, and others, together with alloys thereof such as CoCrMo alloys. Metal powders sinter much as do the ceramic powders. It is believed that various polymer powders, particularly the thermoplastics, such as polytetrafluoroethylene, having particles that can bond to one another at elevated temperatures, may be appropriate for use in the present invention.

Processing

The first step in the process, of course, is to prepare a viscous mixture of the sinterable powder and the sol comprising the primary solvent and polymer. Although processes of the invention are described below in terms of steps, suggesting batch procedures, it should be understood that the steps can be performed on a continuous basis as well.

Simply put, the polymer and primary solvent are combined in a suitable vessel with stirring. The sinterable powder can be added preferably after the polymer sol has been formed, and stirring is continued until the powder is thoroughly dispersed in the sol. The amounts of primary solvent and polymer are adjusted so that a viscous sol is formed. For a given temperature, greater polymer concentrations and higher polymer molecular weights yield more viscous sols; however, in the present invention, it is desired to minimize the polymer concentration in the sol and resulting gel, and polymer weight concentrations based on the liquid of the sol or the gel generally are not greater than 10% and preferably are in the 1% to 7% by weight range.

Particularly when the polymer tends to form a sol-gel with the primary solvent, as in the case with cellulose and NMMO, viscosity can increase rapidly. In this situation it is believed that the solvent, NMMO, has the ability to break hydrogen bonds readily because of the negatively charged oxygen bound to the nitrogen atom of this solvent. Thus, it may be theorized that when cellulose is dissolved in NMMO, part of the dissolution process involves the breaking of hydrogen bonds between adjacent polymer chains to enable the chains to separate from one another to form a viscous sol of polymer colloids in the NMMO. However, after the sol is formed and is contacted with water to replace the NMMO, hydrogen bonds reestablish themselves between polymer chains, causing the polymer to coagulate and come out of solution inasmuch as the polymer is insoluble in the water.

In a typical procedure, a liquid comprising NMMO at a concentration of about 50% by volume in water may be added to a vessel into which is placed also cellulose powder or small pieces of cellulose. The mixture is stirred, and is heated above the boiling point of water. Water vapor, as steam, is observed to come off, thereby increasing the concentration of NMMO to form a primary solvent at an NMMO concentration of about 75% to about 80% by weight. Once the gradually increasing temperature reaches about 105–106° C., a temperature plateau occurs at which water continues to come off, and it is at this point that the cellulose appears to go completely into solution, forming a viscous, light amber clear sol. Desirably, once all the cellulose appears to be in solution and the solution is clear, a suitable amount of sinterable powder, e.g., hydroxyapatite, is added to the sol and is stirred until a uniform, milky-white appearance is obtained, the sol becoming more viscous.

A drop of the viscous sol may now be removed from the container and placed in a beaker of water (the secondary liquid) to form a roughly spherical bead by itself, as NMMO is extracted from the drop by the water. Gradually, by diffusion, the NMMO throughout the bead is replaced by water. When the process is complete, the bead, which may be on the order of 2 mm in diameter, is a spongy and resilient gel. Microscopic examination of the bead at this point shows an open, porous, fibrous bead surface having the powdered hydroxyapatite distributed through it. The particles may be trapped along and between the cellulose fibers; the fibers may also extend through openings and crevices in clumps or agglomerates of the particles. Many of the cellulose fibrils are intimately entwined around the powder particles so that the particles are securely held in place.

Before or after replacement of the primary solvent with the secondary liquid non-solvent, the mixture may be formed as desired. For example, the highly viscous mixture containing the primary solvent, dissolved polymer and sinterable powder may be forced through an appropriately shaped die into a water bath, the viscous polymer sol coagulating from its surface inwardly as it comes into contact with the water. In this manner, tubes, rods and ribbons of material can be produced with ease. Alternatively, the viscous sol, before being shaped, can be immersed in water to replace the NMMO primary solvent with water, and the resulting somewhat spongy material can be pressed into a suitable form in a mold and pressed into the desired shape.

In any event, the shaped material then can be heated to first drive off water and any remaining NMMO, then to pyrolize the cellulose (which occurs at about 600° C.), and thereafter to sinter the finely divided but structured hydroxyapatite particles. Although pyrolysis currently is the method of choice to remove the polymer network, other methods, such as treatment with acid vapors, may also prove valuable.

Although it is explained above for simplicity that the primary solvent—primarily NMMO in our example—is replaced by water, it will be understood that we mean that the NMMO/water primary solvent in which the cellulose is soluble to form a sol is replaced by an NMMO/water solvent containing a much greater concentration of water and in which the cellulose is insoluble, the latter secondary liquid serving to extract NMMO from the primary solvent. The rate of polymer coagulation in this manner can be controlled by regulating the ratio of NMMO to water in the water bath, in the primary solvent, or both.

Of particular interest in connection with many of the products of the invention is the large available surface. Essentially all of the pore surfaces are accessible, since the pores communicate with each other throughout the entire volume of the material. Because of the small pore sizes available, the articles of the invention may be used as filters for filtering from water or other liquids biohazardous microorganisms such as oocysts, proteins or other particulate materials larger than the pores. The pore surfaces, having large surface areas, may serve as supporting surfaces for catalysts. The porous materials exhibit surprising strength for their porosity, and may be used in orthopedic repair applications.

The invention may be more readily understood by reference to the following non-limiting examples:

EXAMPLE 1

In a 150 mL beaker is placed 70 cc of NMMO/water in a 50:50 mixture by weight. Using a stir bar on a magnetic stirring heating mantle, the mixture is stirred at a medium rate while 2.6 g of powdered cellulose (Aldrich Chemical Company) with an average particle size of 20 μm is added. The mix is then heated at a rate of about 0.3° C. per minute min until the mixture temperature reaches 105° C. At this point the water is being removed at an expeditious rate, and the cellulose dissolves, the mixture becoming a smooth, clear, viscous, orange sol. While the sol is still hot, 15.0 g of hydroxyapatite powder with an average particle (agglomerate) size of 5 μm (Plasma Biotal Ltd.) is added and stirred until an even suspension forms, identifiable by the lack of hydroxyapatite clumps and an overall appearance of a milky white, viscous mixture.

Using a plastic syringe, this mixture can be dropped or injected into water to form beads or rods or other extruded shapes such as tubes and sheets. During extrusion from a shaped die, for example, the sol that is emitted may be further stretched or shaped before or as it coagulates to impart some orientation to the resulting sintered product.

In addition, injecting this mixture into a shaped polymer mesh mold, and then placing this mold in a container of water, forms shapes which are defined by that mold. The material needs to remain in water for approximately 24 hours depending on the its thickness. To increase the rate at which the water replaces the primary solvent inside the material, the water is changed periodically to eliminate the local concentration of NMMO that forms around the material. The completely coagulated part is then removed from the water and air dried at room temperature fot approximately 24 hours depending on part thickness and is dried in a forced air oven at 50° C. for 2 hours to ensure dryness. At this point the material is white in color and slightly malleable. The dried part is then heated in air to 1200° C. to pyrolize the cellulose, and is held at this temperature for 2 hours to sinter the interconnected hydroxyapatite particles. The resulting product is a smooth, light blue sintered ceramic having interconnected micropores on the order of one to several microns in size. If the dried part is heated instead in nitrogen, the resulting product is white in color.

EXAMPLE 2

In a 150 mL beaker is placed 70 cc of NMMO/water in a 50:50 mixture by weight. Using a stir bar on a magnetic stirring heating mantle, the mixture is stirred at a medium rate while 2.2 g of powdered cellulose (Aldrich, 20 μm) powder is added. The mix is then heated with continued stirring at a rate of about 0.3° C. per minute until the mixture temperature reaches 105° C. At this point, water is being removed at a expeditious rate, and the cellulose dissolves to form a smooth, clear, viscous, orange sol. This solution is cooled to room temperature, and 7.5 g of the hydroxyapatite powder used in Example 1 is added. Upon stirring, the mixture clumps up to form semisolid particles, with heat being liberated.

The resulting large, off-white particles are then immediately inserted into a pressing die and pressed to approximately 3000 psi. The pressed part is removed from the die, placed in water and soaked for approximately 24 hours. To increase the rate at which the water replaces the NMMO inside the material, the water is changed periodically to eliminate the local concentration of NMMO that forms around the material. The completely coagulated part is then removed from the water and air dried at room temperature for approximately 24 hours. To ensure dryness, the part is dried in a forced air oven at 50° C. for 2 hours. At this point the material is white in color and slightly malleable. The dried part is then heated to 1200° C. in air to pyrolize the cellulose, and is held at this temperature for 2 hours to sinter the hydroxyapatite. The resulting porous ceramic product is light blue in color and has a rough surface.

EXAMPLE 3

In a 150 mL beaker is placed 70 cc of NMMO/water in a 50:50 mixture by weight. Using a stir bar on a magnetic stirring heating mantle, the mixture is stirred at a medium rate while 2.6 g of the powdered cellulose of Example 1 is added. The mix is then heated and stirred as in Example 1 to form a smooth, clear, viscous, orange sol. While this sol is still hot, 15.0 g of the hydroxyapatite powder used in Example 1 is added and is stirred into the viscous sol until an even suspension forms, identifiable by the lack of hydroxyapatite clumps and by an overall smooth, milky white appearance. This mixture is then poured into a water bath where it remains for approximately 24 hours, the water in the bath being changed periodically.

The completely coagulated mass is allowed to air dry at room temperature for approximately 24 hours. At this point the material is white in color and slightly spongy or malleable. The solid material is formed into particles by pressing it through a wire screen with openings of 2 mm, and these resulting particles are pressed in a cylindrical die at 20,000 psi. The resulting object is removed from the die, dried at 50° C., and then heated to 1200° C. to pyrolize the cellulose and to sinter the hydroxyapatite. The resulting product is a strong, microporous ceramic cylinder.

EXAMPLE 4

Into 250 grams of dimethylacetamide and 20 grams of lithium chloride was added 1 gram of chitin powder, with gentle stirring. The chitin was observed to swell, and stirring was continued for about an hour at 25 degrees C. to result in a viscous sol. Hydroxyapatite (60 grams) of the size used in Example 1 is added to the viscous sol with continuous stirring to produce a smooth, homogenous material. The viscous material is placed in a syringe and droplets of the material are permitted to fall into a bath of methanol, and upon removal, the resulting beads were soaked in an aqueous sodium hydroxide solution containing 400 grams of sodium hydroxide per liter. After four hours, the beads are removed, washed in water, and are vacuum dried. The beads themselves may then be raised to about 1200° C. to pyrolize the chitin and to sinter the hydroxyapatite particles. A porous product similar to that of Example 1 was obtained.

EXAMPLE 5

Into a 150 mL beaker is placed 70 cc of NMMO/water in a 50:50 mixture by weight. Using a stir bar on a magnetic stirring heating mantle, the mixture is stirred at a medium rate while 0.8 g of Whatman 4 filter paper is added in small, cut sections. The mix is then heated at a rate of 0.3° C. per minute until the mixture temperature reaches 105° C. At this point the water is being removed at an expeditious rate and the cellulose dissolves, the mixture becoming a smooth, clear, viscous, amber sol. While the sol is still hot, 10.0 g of the hydroxyapatite powder referred to in Example 1 is added and the mixture is stirred until an even suspension forms, identifiable by the lack of hydroxyapatite clumps and an overall appearance of a milky, white, viscous mixture.

While hot, the sol is placed into a bell jar and subjected to three vacuum cycles in which a vacuum of 27 inches of Hg is drawn and released so that the sol is nearly completely degassed.

Using a plastic syringe, the mixture is dispensed into a petri dish to a depth of about 3 mm and allowed to cool until solid. It is then removed from the dish as a solid mass and placed into water to exchange out the NMMO. To increase the rate at which the water replaces the primary solvent inside the material, the water is changed periodically to eliminate the local concentration of NMMO that forms around the material. When the part is completely coagulated, it is removed from the water and dried in air for approximately 24 hours at room temperature and then is dried in a forced air oven at 50° C. to ensure complete dryness. The dried part is placed between two flat alumina plates and heated in air to 1200° C. and held at this temperature for 2 hours to pyrolize the cellulose and sinter the hydroxyapatite, the alumina plates supporting the part in a flat configuration. The resulting product is a flat, rigid disc of porous ceramic approximately 5 cm in diameter and about 1.5 mm in thickness. The disc exhibits a pore size between 0.1 and 10 $\mu$m and is relatively free of any air bubbles. The product has a specific surface of about 1 to about 2 $m^2/g$, an open void volume of about 25% to about 35% and compressive strength in the range of about 10,000 to about 20,000 psi. Upon visual examination, the disc has a smooth surface, the pores of which can be seen under magnification. The interconnected pores extend entirely through the thickness of the disc, permitting the disc to serve as a filter for filtering particulates from a gas or liquid.

EXAMPLE 6

The procedure of Example 1 is duplicated to provide a milky white, viscous sol containing hydroxyapatite powder. Into the hot sol is mixed, with stirring, an NMMO primary solvent to reduce the viscosity of the sol while preserving the sol structure. The resulting hot sol of reduced viscosity is then forced through a spray nozzle into a water bath, the droplets issuing from the spray nozzle coalescing in the water as small, spheroidal particles. The particles are dried and then slowly heated to about 1200° C. to pyrolize the cellulose and sinter the remaining hydroxyapatite particles to form small, spheroidal beads of sintered hydroxyapatite.

EXAMPLE 7

In a 150 mL beaker is placed 35 cc of NMMO/water in a 50:50 mixture by weight. Using a stir bar on a magnetic stirring heating mantle, the mixture is stirred at a medium rate while 1.5 g of Aldrich powdered cellulose with an average particle size of 20 $\mu$m is added. The mix is then heated at a rate of about 0.3° C. per minute min until the mixture temperature reaches 105° C., whereupon the cellulose dissolves, the mixture becoming a smooth, clear, viscous, orange sol. While the sol is still hot, 5.0 g of sub micron size alumina powder (Alcoa) is added with stirring until a smooth, generally milky white suspension forms.

The mixture, while still hot, is poured drop by drop into a water bath, the droplets coagulating into small, spheroidal beads. The water is changed periodically to speed up the coagulation throughout the thicknesses of the beads. After air drying at room temperature for approximately 24 hours, the beads are dried in a forced air oven at 50° C. for 2 hours to ensure dryness. At this point the material is white in color and slightly malleable. The beads are then heated in air to 1200° C. to pyrolize the cellulose and are held at this temperature for 2 hours to sinter the interconnected alumina particles. The resulting beads are smooth and have interconnected micropores on the order of one to several microns in size.

EXAMPLE 8

Example 7 is repeated except that 10 g of a CoCrMo alloy powder having an average particle size of about 1 micron is employed in place of the alumina powder. The forming of beads and drying is carried out as in Example 7, and the beads are subsequently heated to 1000° C. in hydrogen to pyrolize the cellulose and to sinter the alloy particles. The resulting beads exhibit a highly porous structure and otherwise show metallic behavior, e.g., they are malleable and electrically conductive. Tiny, porous metal beads of this type may be used as coatings for the bone-contacting surfaces of implanted bone prostheses such as knee and hip stem implants to encourage bone growth.

EXAMPLE 9

Example 8 is repeated, except that iron particles are substituted for the CoCrMo alloy particles. Sintering at 1000° C. yields small, highly porous iron beads which, when placed in contact with a drop of liquid hydrocarbon lubricant, rapidly absorb the lubricant. We contemplate that the resulting lubricant-containing particles may be mixed with other iron particles and employed as a feedstock for powder metallurgy processes, the feedstock being subsequently compressed under very high pressures to form an article and the lubricant from the lubricant-containing particles serving to lubricate the resulting article.

While preferred embodiments of the present invention have been described, it should be understood that various changes, adaptations and modifications may be made therein without departing from the spirit of the invention and the scope of the appended claims.

What is claimed is:

1. A flat, porous, rigid disc having an outer surface defining a shape having a bulk volume and having interconnecting openings extending throughout said volume in a reticulated, three dimensional configuration and opening through said surface, said article being formed by a method comprising forming into a predetermined shape a shapeable, viscous mixture comprising a sinterable powder comprised of particles dispersed in a sol of a polymer in a primary solvent, contacting said sol in the primary solvent with a secondary liquid in which the polymer is insoluble to produce a gel comprising an open polymeric network comprised of microfibrils and having said sinterable powder arranged therein with the positions of the particles guided by the positions of the microfibrils, removing said secondary liquid from the gel, and heating the gel to remove said polymeric network and to sinter said sinterable powder to form said shaped porous structure, the resulting reticulated, three dimensional configuration of the product following the position of the microfibrils.

2. The product of claim 1 wherein said polymer is a polysaccharide.

3. The product of claim 1 wherein said primary solvent is an amine oxide.

4. Method of producing an open, porous beads each having an outer surface defining a bead shape having a bulk volume and having interconnecting openings extending throughout said volume and opening through said surface comprising
    a. preparing a viscous mixture comprising a sinterable powder comprised of particles dispersed in a sol of a polymer selected from the group consisting of chitin, starch and a mixture thereof in a primary solvent,
    b. replacing said primary solvent with a secondary liquid in which the polymer is insoluble to produce a gel comprising an open polymeric network comprised of microfibrils and having said sinterable powder arranged therein with the positions of the particles being guided by the positions of the microfibrils,
    c. removing said secondary liquid from said gel; and
    d. sintering said sinterable powder to form open, porous beads, the resulting bead having a reticulated, three dimensional configuration that follows the position of the microfibrils.

5. The method of claim 4 including, after step (c), the step of removing said polymeric network.

6. The method of claim 4 wherein said viscous mixture is prepared by heating said polymer in a mixture of said primary solvent and a liquid non-solvent for said polymer to remove at least part of said non-solvent and to form said viscous sol.

7. The method of claim 4 wherein said polymer is chitin and said primary solvent comprises dimethylacetamide and lithium chloride.

8. The method of claim 4 including, before step (b), the step (e) of forming said viscous mixture into the shape of beads.

9. The method of claim 8 wherein said beads are formed by dropping drops of said viscous mixture into said secondary liquid.

10. The method of claim 4 wherein said polymeric network is removed by pyrolysis.

11. A product resulting from the method of any one of claims 4–10.

12. Method of producing an open, porous structure having an outer surface defining a shape having a bulk volume and having interconnecting openings extending throughout said volume and opening through said surface comprising
    a. preparing a viscous mixture comprising a sinterable powder dispersed in a sol of a polymer selected from the group consisting of chitin, starch and a mixture thereof in a primary solvent,
    b. contacting said viscous mixture drop by drop with a secondary liquid in which the polymer is insoluble to replace said primary solvent with said secondary liquid and to produce a gel comprising an open polymeric network comprised of microfibrils and having said sinterable powder arranged therein,
    c. removing said secondary liquid from said gel; and
    d. sintering said sinterable powder to form said open, porous structure.

13. A shaped, porous product having an outer surface defining a shape having a bulk volume and having interconnecting openings extending throughout said volume in a reticulated, three dimensional configuration and opening through said surface, said article being formed by a method comprising forming into a predetermined shape a shapeable, viscous mixture comprising a sinterable powder comprised of particles dispersed in a sol of a polymer selected from the group consisting of chitin, starch and a mixture thereof in a primary solvent, contacting said sol in the primary solvent drop by drop with a secondary liquid in which the polymer is insoluble to produce a gel comprising an open polymeric network comprised of microfibrils and having said sinterable powder arranged therein with the positions of the particles guided by the positions of the microfibrils, removing said secondary liquid from the gel, and heating the gel to remove said polymeric network and to sinter said sinterable powder to form said shaped porous structure, the resulting reticulated, three dimensional configuration of the product following the position of the microfibrils.

14. A shaped, porous product having an outer surface defining a shape having a bulk volume and having interconnecting openings extending throughout said volume in a reticulated, three dimensional configuration and opening through said surface, said article being formed by a method comprising forming into a pre-determined shape a formable product comprising, in combination, a gel formed by contacting drop by drop a viscous sol of a polymer selected from group consisting of chitin, starch and a mixture thereof in a primary solvent with a secondary liquid in which the polymer is insoluble, the weight ratio of polymer to secondary liquid in the gel not exceeding about 1/10, and a sinterable powder comprised of particles arranged in the gel, wherein the gel comprises an open polymeric network comprised of microfibrils and has said sinterable powder arranged therein with the positions of the particles being guided by the positions of the microfibrils, and sintering said product.

\* \* \* \* \*